Oct. 7, 1941.     P. W. ROM     2,258,069
VEHICLE SIGNAL
Filed Nov. 25, 1938     2 Sheets-Sheet 1
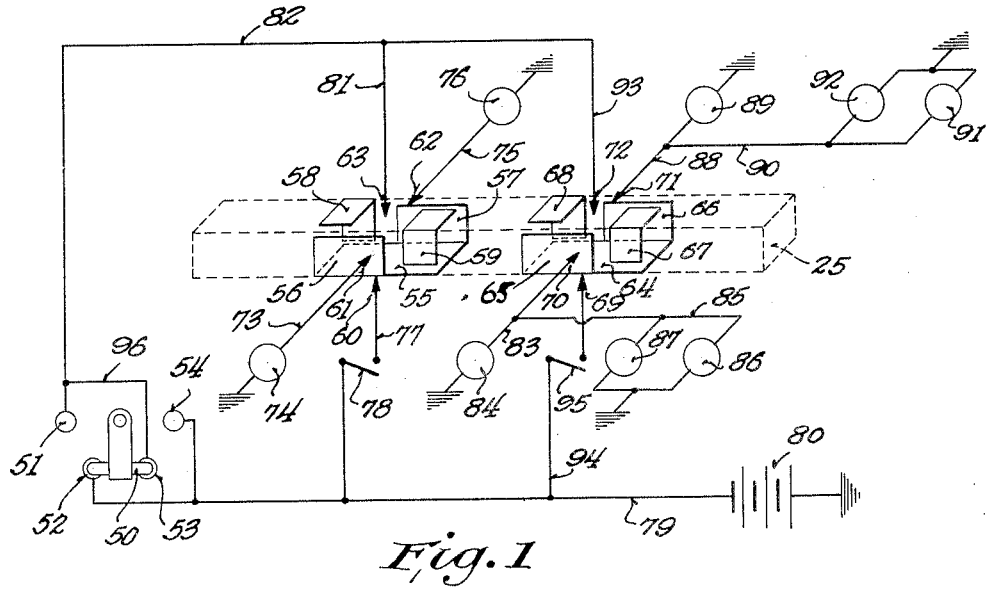
Fig.1
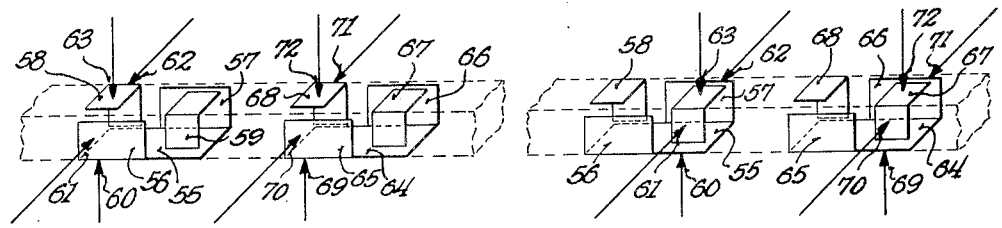
Fig.2     Fig.3
Fig.4
INVENTOR.
Palmer W. Rom
BY Louis O. French
ATTORNEYS.

Oct. 7, 1941.  P. W. ROM  2,258,069
VEHICLE SIGNAL
Filed Nov. 25, 1938  2 Sheets-Sheet 2
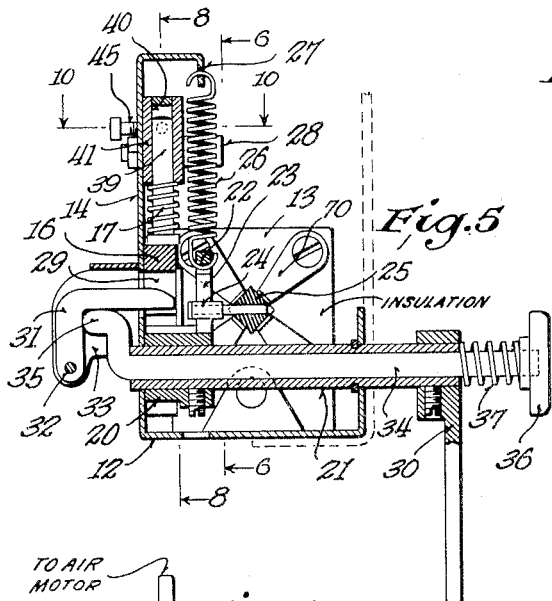
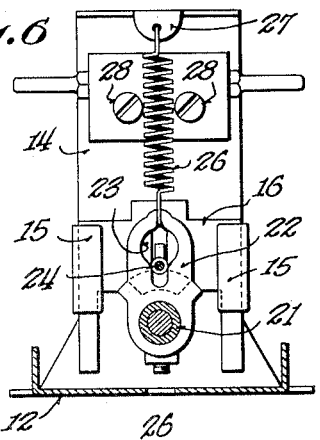
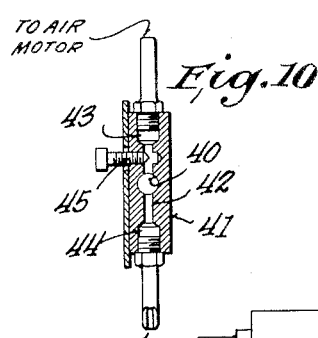
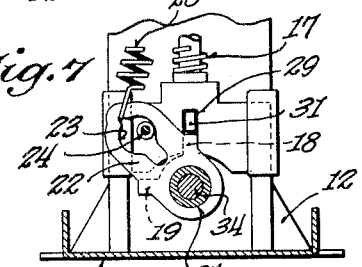
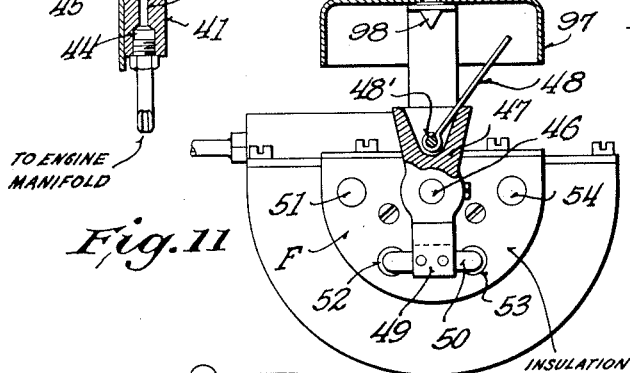
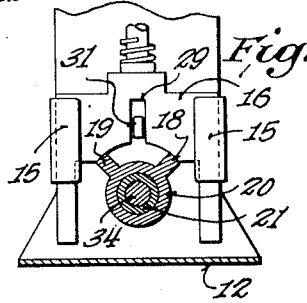
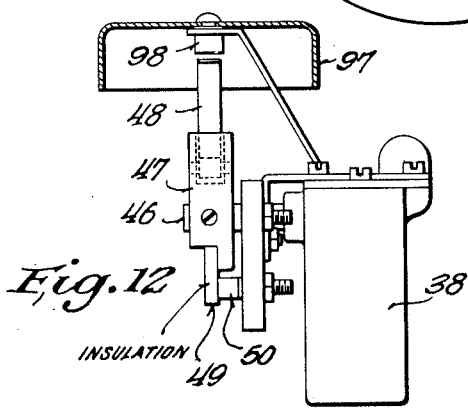
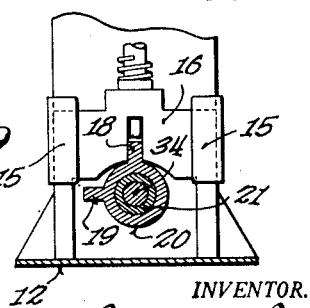
INVENTOR.
Palmer W. Rom
BY Louis O. French
ATTORNEYS.

Patented Oct. 7, 1941

2,258,069

UNITED STATES PATENT OFFICE 2,258,069

VEHICLE SIGNAL

Palmer W. Rom, Cudahy, Wis.

Application November 25, 1938, Serial No. 242,391

1 Claim. (Cl. 177—337)

The invention relates to vehicle signals.

One of the objects of the invention is to provide a new and improved switch structure for controlling the signal lights which in addition to controlling the particular circuits desired also controls a means for intermittently energizing the circuit, said means being rendered operable when the switch is moved to signalling position and being cut off when the switch is moved to inoperative position.

A further object of the invention is to provide a signalling system in which the conventional lighting arrangement includes a pair of tail lights and stop lights at the rear of the vehicle, one of the sets of tail lights and stop lights being operable to indicate a turn while the other of the set remains normally lighted.

Another object of the invention is to provide a signalling system using the conventional four marker lights of the vehicle, two of which may be headlights in addition to the usual stop lights as turn signal lights, the signal being given by flashing the lights on one side of the vehicle while the other lights function in the usual manner.

A further object of the invention is to provide a signalling system in which the conventional lighting arrangement includes a pair of tail lights and stop lights at the rear of the vehicle, one of said pair of tail lights and stop lights being selectively operable to produce flashing lights, the set of flashing lights indicating the direction in which the vehicle is to be turned while the other of said sets of tail lights and stop lights remains normally lighted.

A further object of the invention is to provide a flasher switch means controlling a flasher switch audible tell tale associated with a directional switch mechanism, the audible tell tale to indicate the operation of the flasher switch means and to remind the operator to return the directional switch mechanism to non-indicating or normal position when the need for the turn signal has passed.

The invention further consists in the several features hereinafter set forth and more particularly defined by the claim.

Referring to the drawings:

Fig. 1 is a diagrammatic view of a circuit arrangement embodying the invention, the circuit arrangement being in non-indicating position;

Fig. 2 is a detailed view of parts shown in Fig. 1, showing said parts in position for a left hand turn;

Fig. 3 is a view similar to Fig. 2 showing the parts in position for a right hand turn;

Fig. 4 is an elevation view of the switch mechanism embodying the invention;

Fig. 5 is a vertical sectional view taken on the line 5—5 of Fig. 4;

Fig. 6 is a detailed sectional view taken on the line 6—6 of Fig. 5;

Fig. 7 is a detailed sectional view taken similar to Fig. 6 showing the parts in another position;

Fig. 8 is a detailed sectional view taken on the line 8—8 of Fig. 5, showing the parts in one position;

Fig. 9 is a detailed sectional view similar to Fig. 8 showing the parts in another position;

Fig. 10 is a detailed sectional view taken on the line 10—10 of Fig. 5;

Fig. 11 is a front elevation view of the flasher switch and telltale signal mechanism, parts being broken away and parts being shown in section;

Fig. 12 is a side elevation view of the device shown in Fig. 11.

Referring to the drawings, the switch mechanism includes a frame 12 having blocks 13 of insulation secured thereto at the sides thereof and a back portion 14 provided with flanges 15 forming guides for a latch member 16 of fiber or other suitable material slidably mounted therein, said latch member being normally urged downwardly by a spring 17.

The latch member 16 has a slot 29 therein that alternately engages catches or projections 18 and 19 on a member 20 mounted on a hollow shaft 21 and also provided with an arm 22 having a slot or opening 23 therein into which a pin 24 carried by a bar 25 projects.

The bar 25 is of suitable insulating material, and its ends are slidably mounted in the blocks 13. The slotted crank arm 22 acts on the pin 24 to convert the swinging motion of said arm into reciprocatory motion of said bar.

The crank arm 22 is normally retained in an inoperative position by means of a spring 26 which is connected at one end to said arm and at the other to a lug 27 on the upper end of the frame 12. The intermediate portion of the spring 26 works between two stops 28 which are here shown in the form of screws. Swinging of the arm 22 in one direction bends the spring 26 about one of the screws and stretches the spring while swinging said arm in the opposite direction bends the spring 26 about the other of the screws and thus stretches it. The tensioned spring 26 acts to return the arm 22 from an inclined signalling position to an upright position. With this arrangement when the arm 22 is swung toward the left as shown in Fig. 7, the latch 16 moves down so that its slot 20 engages the projection 18, and when the arm 22 is swung toward the right, the latch 16 moves down so that its slot 20 engages the projection 19.

The shaft 21 is provided with a manually operable arm 30 in the form of a pointer for moving the arm 22 to either of its inclined signalling positions. In order to release the arm 22 from its signalling position, a lever 31 has its free end mounted to move in the slot 20 and is adapted to engage the upper end of said slot so as to raise the latch 16 to a position above the projections 18 or 19 and thus allow the spring 26 to return the arm 22 to a normal or non-indicating position. The lever 31 is pivotally connected by a pin 32 to arms 33 on the frame 14 and is moved to release position by a push rod 34 which has an upturned end 35 engaging an intermediate portion of the lever and extends through the hollow of the shaft 21 and carries a push button 36 on its outer end, said rod 34 being normally moved to a release position by a spring 37 interposed between the button 36 and the end of the shaft 21.

Thus swinging movement of the arm 30 to either the right or the left acts to move the bar 25 to a signalling position either to the right or the left, and in this position the parts are locked by the parts which are locked by the latch member 16 until the operator on pressing inwardly on the rod 34, operates the lever 31 to release the latch 16 and allow the spring 26 to return the arm 22, shaft 21, and bar 25 to a non-indicating position.

Means are also provided for operating a flasher switch mechanism during the time the signal is being given, and for this purpose I preferably provide an air-operated motor 38 not shown in detail but of the type commonly employed for operating the windshield cleaner on an automobile from a suction connection with the intake manifold of the engine, this suction connection being controlled by valve mechanism operable from the latch mechanism and in the present instance comprising a cylindrical valve member 39 working in a bore 40 in a valve casing 41 which has a transverse passage 42 controlled by said valve, one end 43 of said passage being connected to said motor 38 and the other end 44 being connected to the intake manifold, said passage having a screw 45 extending into it for varying the area of said passage to vary the suction effect on said motor. The stem of the valve member 39 is mounted on the latch member 16 and is surrounded by the spring 17. With this arrangement when the arm 22 is in a signalling position, the latch member 16 is in a depressed position, and under these conditions the valve 39 has been moved below the passage 42, and the air motor 38 is being operated through the suction connection with the intake manifold. Operation of the air motor causes oscillatory movement of its shaft 46 which carries an arm 47 which at one end has a flat spring bar clapper 48 pivotally mounted thereon on a pin 48', and at its opposite end carries an insulated block 49 that has a bridging contact 50 mounted thereon. The bridging contact 50 is adapted to bridge contacts 51 and 52, 52 and 53, and 53 and 54, said contacts being inset in insulating material and included in circuits hereinafter described.

The bar 25 is provided with a plurality of contacts adjacent each end. At one end of the bar there is a contact 55 inset in one side of the bar which connects or forms a part of spaced contacts 56 and 57 on opposite sides of the bar, and there are spaced angular contacts 58 and 59 inset in the bar, one of the sides of these last named contacts being on the upper side of the bar while the other side of the contact 58 is on the same side as the contact 57 and the other side of the contact 59 is on the same side as the contact 56. Brushes or yieldable contact fingers 60, 61, 62, and 63 engage the bar 25, the finger 60 engaging that side of the bar having the contact 55 thereon, the finger 61 engaging that side having the contact 56 thereon, the contact finger 62 engaging that side having the contact 57 thereon, and the finger 63 engaging that side having parts of contacts 58 and 59 thereon.

At the other end of the bar there is a contact 64 inset in one side of the bar which connects or forms a part of spaced contacts 65 and 66 on opposite sides of the bar, and there are spaced angular contacts 67 and 68 inset in the bar, one of the sides of the last named contacts being on the upper side of the bar while the other side of the contact 67 is on the same side of the bar as the contact 65 and the other side of the contact 68 is on the same side as the contact 66. Brushes or yieldable contact fingers 69, 70, 71, and 72 engage the bar 25, the contact finger 69 engaging that side of the bar having the contact 64 thereon, the contact finger 70 engaging that side having the contact 65 thereon, the contact finger 71 engaging that side having the contact 66 thereon, and the contact 72 engaging the side of the bar having parts of the contacts 67 and 68.

The brushes are connected in circuit with the lights of the lighting system of the vehicle as will now be described. The brush 61 connects by conductor 73 with the right stop light 74. The brush 62 connects by conductor 75 with the left stop light 76. The brush 60 connects by conductor 77 including a stop light switch 78 with a conductor 79 leading to one side of a battery 80 whose other side is grounded. The brush 63 connects by a conductor 81 with a conductor 82 which leads to the contact 51 of the flasher switch F.

The brush 70 connects by a conductor 83 with a right rear marker light 84 and by a branch conductor 85 with a right front marker or headlight 86 and a right telltale light 87. The brush 71 connects by a conductor 88 with a left rear marker light 89 and by a branch conductor 90 with a left front marker or headlight 91 and a left telltale 92. The brush 72 connects by a conductor 93 with the conductor 82 and the brush 69 connects by a conductor 94 with the conductor 79, said conductor 94 having the lighting switch 95 therein.

The lights 74, 76, 84, 87, 86, 89, 92, and 91 each have one of their terminals grounded.

The contacts 52 and 54 of the flasher switch are connected to the conductor 79, and the contact 53 is connected by the conductor 96 with the conductor 82.

With the above described arrangement, when the bar 25 is in its non-signalling position shown in Fig. 1, the contacts 60 and 62 are in contact with the contacts 55 and 57, respectively, and the contact 61 is in contact with the contact 56, and the contacts 68 and 64 are in contact with the contacts 71 and 69, respectively, and the contact 65 is in contact with the contact 70. Under these conditions if the lighting switch 95 is on, the current will flow from the battery 80 to conductors 79 and 94 to contacts 69, 64, 65, and 66 and thus operate the lights 84, 87, 86, 89, 92, and 91, and if the stop light switch 78 is "on," the current will also flow through conductor 77 to contacts 55, 56, and 57 and thus operate the right and left stop lights. Thus the marker lights, at both sides of the vehicle and indicator lights will be lighted, and also both of the stop lights in case the stop light switch is depressed, usually through the actuation of the brake pedal.

If now the bar 25 is shifted to the right to indicate a left turn, the relation of the yielding contacts to the contacts on the bar will appear as shown in Fig. 2 in which the contacts 61 and 60 are still engaged with the contacts 56 and 55 so that the right stop light will be lighted constantly when the stop light switch 78 is "on" while the contacts 63 and 62 will engage the contact 58 so that the left stop light 76 will be intermittently lighted since the current for said light is then passing from the battery 80, conductor 79, flasher switch F including contacts 51, 52, 53, and 54 to conductors 82 and 81. At the same time the contacts 70 and 69 will be still engaged with the contacts 65 and 64 so that the right tail light 84, the right tell-tale lamp 87, and the right front marker or headlight 86 will be lighted constantly when the lighting switch 95 is "on" while the contacts 72 and 71 will engage the contact 68 so that the rear tail light 89, the left tell-tale light 92, and the left front marker or headlight 91 are intermittently lighted since the current for said lights is then passing from the battery 80 through the flasher switch F and conductor 82, as before, to conductor 72 and thence to the conductor 71. Thus during a left turn the lights 76, 89, 92, and 91 at the left hand side of the vehicle will be flashing to indicate the turn while the light 74, if the stop light switch 78 is "on," and the lights 84, 87, and 86 will be constantly lighted if the switch 95 is "on" for night driving. If neither the stop light switch 78 or the lighting switch 95 is "on," both the stop light and tail light at the left side of the vehicle and the front light on the corresponding side will be operated to produce a flashing turn signal when the indicator switch is operated to signal a left turn.

If now the bar 25 is shifted to the left to indicate a right turn, the relation of the yielding contacts to the contacts on the bar will appear as shown in Fig. 3 in which the contacts 62 and 60 are still engaged with the contacts 57 and 55 so that the left stop light 76 will be lighted constantly when the stop light switch 78 is "on" while the contacts 63 and 61 will engage the contact 59 so that the right stop light 74 will be intermittently lighted since the current for said light is then passing from the battery 80, conductor 79, flasher switch F including contacts 51, 52, 53, and 54 to conductors 82 and 81. At the same time the contacts 71 and 69 will be still engaged with the contacts 66 and 64 so that the left hand lights 89, 92, and 91 will be constantly lighted while the engagement of contacts 72 and 70 with the contact 67 will bring the intermittent flashing current from the conductor 82 to conductor 93, contacts 72, 67, and 70 to conductors 83 and 85 causing the right hand lights 84, 87, and 86 to be intermittently lighted. Thus during a right turn the lights 74, 84, 87, and 86 will be intermittently lighted to indicate the turn while the light 76, if the stop light switch 78 is "on," and lights 89, 92, and 91 will be constantly lighted if the switch 95 is "on" for night driving. If neither the stop light switch 78 or the lighting switch 95 is "on," both the stop light and tail light at the right side of the vehicle and the front light on the corresponding side will be operated to produce a flashing turn signal when the indicator switch is operated to signal a right turn.

It is also to be noted that the circuit connections to the lights provide a direct connection from the battery through the direction indicator switch to one set of lights while another parallel connection includes the flasher switch mechanism and the direction indicator switch to the other set of lights.

While the contacts 60, 62, 63, 69, 71, and 72 have not been shown in detail, it will be understood that they are similar to the contacts 61 and 70 herein shown.

It is also to be noted that during the time the turn signal is being given, the valve 39 has been opened to cause the motor 38 to operate the flasher switch and at the same time oscillate the bell clapper 48 causing it to strike the bell housing 97, it being noted that a projection 98 in the housing engages the clapper 48 as its upper end moves past top center and thus causes said clapper to snap past said projection and strike the bell housing a sharp blow, thus giving an audible signal.

I desire it to be understood that this invention is not to be limited to any particular form or arrangement of parts except in so far as such limitations are included in the claim.

What I claim as my invention is:

In a vehicle signalling system, the combination of one set of lights at the front of the vehicle and at each side thereof, and two sets of lights at the rear of the vehicle, one light of each last mentioned set being at each side thereof and one set of said last named lights being stop lights, a source of current for said lights, a directional switch having three selectable parallel circuit connections with said source of current, one of said parallel circuit connections including a control switch normally controlling the flow of current from said source to both lights at the front of the vehicle and one set of lights at the rear of the vehicle simultaneously, the second of said parallel circuits including a stop light switch normally controlling the flow of current from said source to both of said stop lights simultaneously, the third of said parallel circuits including a flasher switch connecting said source of current with said directional switch and selectively connectable thereby to the lights on either side of the vehicle to indicate a turn by intermittently energizing the lights so connected while the lights on the other side of the vehicle are constantly lighted if said control switch and stop light switch are "on."

PALMER W. ROM.